J. H. HAND.
CAR BRAKE.
APPLICATION FILED JULY 26, 1909.

949,471.

Patented Feb. 15, 1910.
2 SHEETS—SHEET 1.

Witnesses
Chas. E. Wren
Virginia C. Spratt

Inventor
Jesse H. Hand
By Parker & Burton
Attorneys

UNITED STATES PATENT OFFICE.

JESSE H. HAND, OF ANN ARBOR, MICHIGAN.

CAR-BRAKE.

949,471.  Specification of Letters Patent.  Patented Feb. 15, 1910.

Application filed July 26, 1909. Serial No. 509,645.

*To all whom it may concern:*

Be it known that I, JESSE H. HAND, citizen of the United States, residing at Ann Arbor, county of Washtenaw, State of Michigan, have invented a certain new and useful Improvement in Car-Brakes, and declare the following to be a full, clear, and exact description of the same, such as will enable others skilled in the art to which it pertains to make and use the same, reference being had to the accompanying drawings, which form a part of this specification.

This invention relates to car brakes; it has for its object an improved brake adapted to be applied to railway cars, and the improved method of setting the brakes against the wheel.

Figure 1:
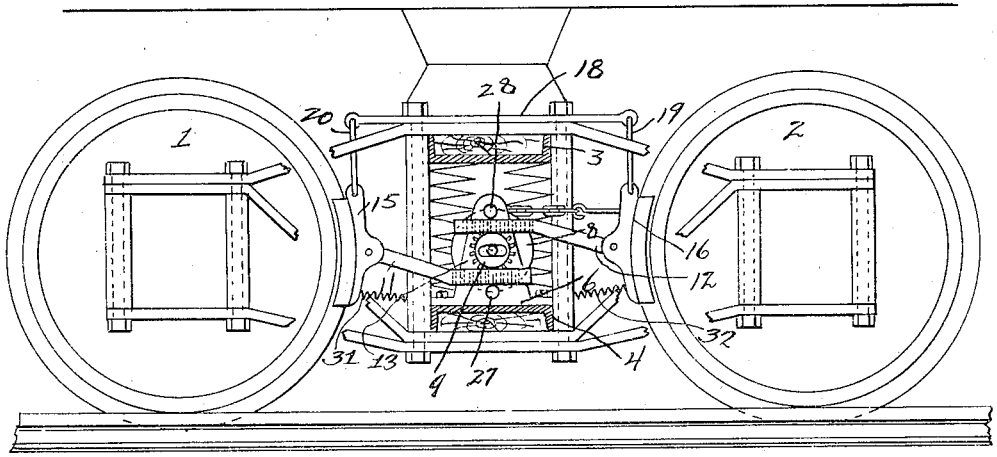
Figure 3:
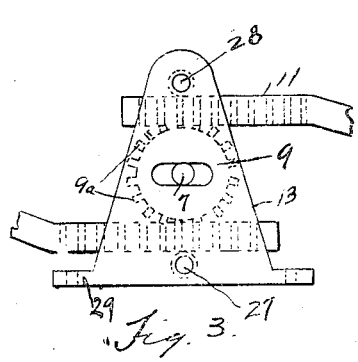
Figure 4:
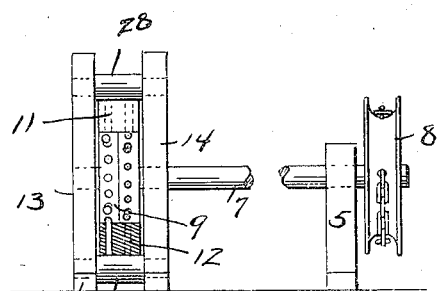
Figure 2:
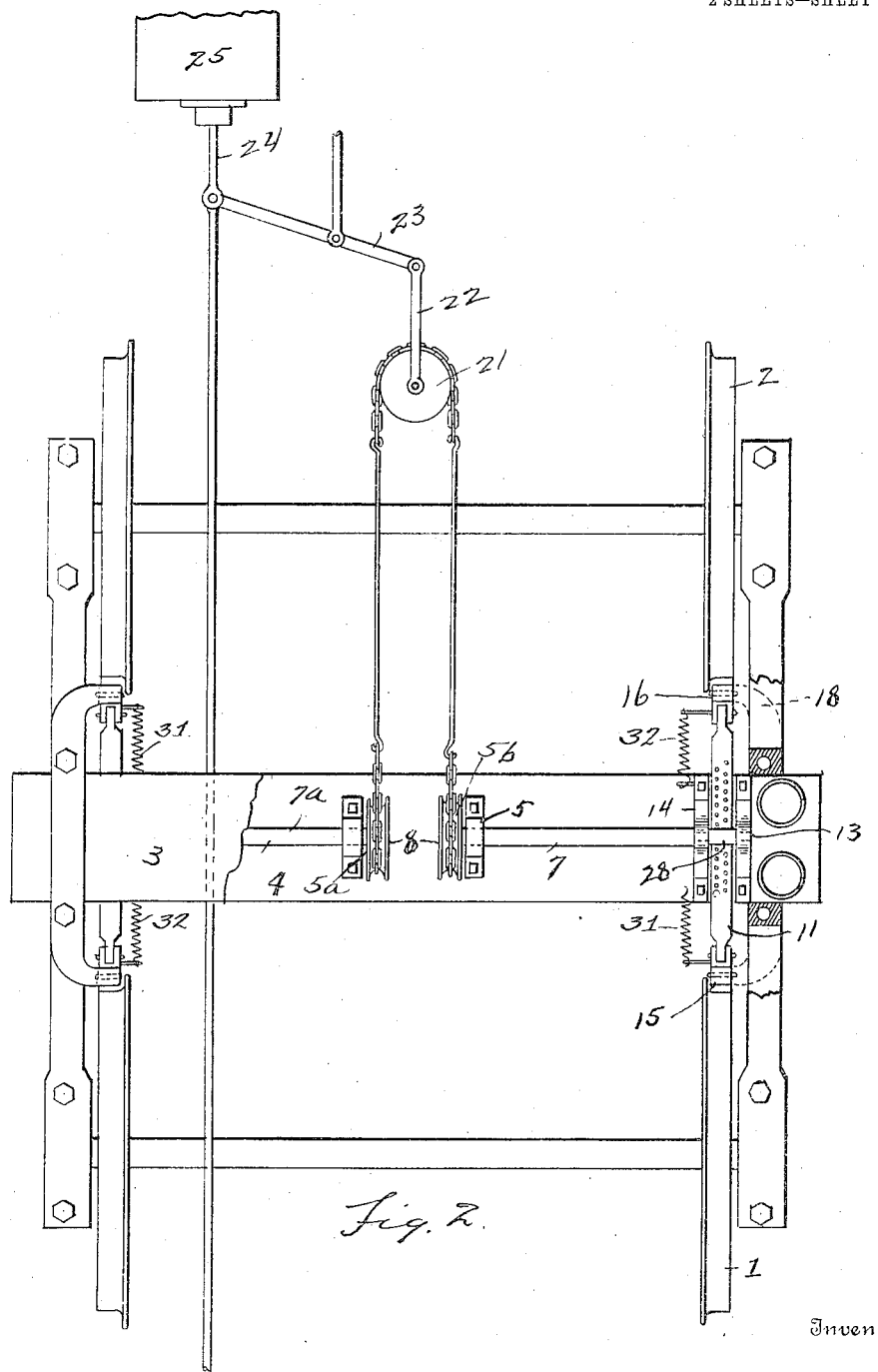

In the drawings:—Figure 1, is a side elevation. Fig. 2, is a plan view, with the parts broken away. Fig. 3, is a detail of the actuating wheel of the car brake. Fig. 4, is an elevation longitudinal of the shaft of the wheel, shown in Fig. 3.

The truck wheels 1 and 2 are carried in a frame having a central transom beam, with members 3 and 4, on the lower of which is mounted a bearing bracket 5 near the middle of the transom, and a bearing bracket 6 substantially between the truck wheels and near the end of the lower member of the transom. A shaft 7, mounted in bearings 5 and 6, carries on its inner end a pulley wheel 8, and on its outer end a pin gear wheel 9. The shaft 7 passes through slotted openings in the supporting bracket 13 and 14, and is capable of a slight travel in either direction from a central position. The object of this slight travel is to compensate for any possible inequality of wear or loss of the shoes. The shaft is fixed to the wheel 9, and drives the racks 11 and 12 in opposite directions to bring them into braking engagement with the wheels. The racks are made with holes to receive pin teeth 9ª on gear wheel 9. The brake heads 15 and 16 are pivotally supported on the ends of the rack arms 11 and 12, and are also supported from a cross bar 18, carried by the transom, by means of the links 19 and 20. To these brake heads there may be attached coil springs 31 and 32 to provide for disengaging said heads from the wheels. Preferably there are two shafts, 7 and 7ª, supported on the same transom, driven by chain wheels 5ᵇ and 5ª, and connected to a sheave wheel 21, which is carried by a link 22, from brake lever 23. The brake lever 23 is actuated by the piston rod 24 from the cylinder 25 in the ordinary way.

Between each rack bar and the bearing which holds it in place with respect to the wheel, is a roller 27 or 28. The roller 27 engages between the rack bar 12, and the plate 29, at the rear of the rack bar 12, and the roller 28 engages at the back of the rack bar 11.

What I claim is:—

In a car brake mechanism, the combination of brake heads, provided with rack arms pivotally connected thereto, a unitary gear wheel arranged to actuate a pair of rack arms in opposite directions, and means for compensating said brake heads and utilizing one of said brake heads as an abutment to force the other into engagement with the wheel, substantially as described.

In testimony whereof I sign this specification in the presence of two witnesses.

JESSE H. HAND.

Witnesses:
 CHARLES F. BURTON,
 VIRGINIA C. SPRATT.